United States Patent [19]

Buzak et al.

[11] Patent Number: 4,884,874
[45] Date of Patent: Dec. 5, 1989

[54] METHOD OF ADDRESSING DISPLAY REGIONS IN AN ELECTRON BEAM-ADDRESSED LIQUID CRYSTAL LIGHT VALVE

[75] Inventors: Thomas S. Buzak, Beaverton; Rolf S. Vatne, Portland, both of Oreg.

[73] Assignee: Tektronix, Inc., Beaverton, Oreg.

[21] Appl. No.: 219,510

[22] Filed: Jul. 14, 1988

Related U.S. Application Data

[62] Division of Ser. No. 46,822, May 5, 1987, Pat. No. 4,765,717.

[51] Int. Cl.$^4$ ................................................. G02F 1/13
[52] U.S. Cl. ..................................... 350/336; 350/320; 350/331 R; 350/332; 358/65; 358/223; 358/236
[58] Field of Search .................... 350/320, 331 R, 332, 350/336, 342, 351; 358/65, 223, 236, 213.12, 213.13

[56] References Cited

U.S. PATENT DOCUMENTS

| | | | |
|---|---|---|---|
| 3,578,844 | 5/1971 | Churchill et al. | 350/351 |
| 3,844,650 | 10/1974 | Nicholson et al. | 350/331 R X |
| 4,387,964 | 6/1983 | Arrazola et al. | 350/331 R |
| 4,765,717 | 8/1988 | Buzak et al. | 350/331 R |

Primary Examiner—Stanley D. Miller
Assistant Examiner—Richard Gallivan
Attorney, Agent, or Firm—John D. Winkelman; Mark M. Meininger

[57] ABSTRACT

An electron beam addressed liquid crystal light modulator or "valve" (10) includes a liquid crystasl cell (40) having a target surface (45) which a writing electron beam (60a) and an erasing electron beam (60b) address to provide a display image. The writing electron beam and the erasing electron beam sequentially strike preselected locations on the target surface to cause an emission of secondary electrons and, thereby, develop an electrostatic potential at such preselected locations. A secondary electron collector electrode (66) positioned over and above the target surface collects in a uniform manner the secondary electrons emitted by all regions of the target surface. A collector electrode controller circuit (81) sequentially applied first and second potential differences between the target surface and the collector electrode in synchronism with the striking of the preselected locations by the respective writing and erasing beams. The first potential difference causes the collector electrode to collect a sufficient number of the secondary electrons to maintain the electrostatic potential at the preselected locations on the target surface. This causes the liquid crystal cell to transmit light in a first polarization sense. The second potential difference causes the collector electrode to collect a relatively small number of the secondary electrons. The remaining secondary electrons redistribute over the target surface and change the electrostatic potential at the preselected locations.

17 Claims, 5 Drawing Sheets

4,884,874

METHOD OF ADDRESSING DISPLAY REGIONS IN AN ELECTRON BEAM-ADDRESSED LIQUID CRYSTAL LIGHT VALVE

This application is a division of Ser. No. 07/046,822 filed May 5, 1987 and now U.S. Pat. No. 4,765,717.

TECHNICAL FIELD

The present invention relates to projection type image display apparatus and, in particular, to an electron beam addressed liquid crystal light modulator or "valve" of the cathode-ray tube type used in such apparatus.

BACKGROUND OF THE INVENTION

An electron beam addressed liquid crystal light valve of the cathode-ray tube type is described in Duane A. Haven, *IEEE Transactions on Electron Devices*, Vol. ED-30, No. 5, 489–492, May 1983. The light valve of Haven is a form of cathode-ray tube (CRT) having a twisted nematic liquid crystal cell, one substrate surface of which serving as a target for a writing electron beam propagating in the tube. The target substrate comprises a thin sheet of dielectric material and forms one face of the liquid crystal cell.

The CRT also includes a writing electron gun, a flood electron gun, and a ring-type collector electrode positioned adjacent the periphery of the target surface. The flood electron gun maintains the target surface of the cell at a desired operating electrostatic potential $V_{FG}$, which is the potential of the flood electron gun cathode. Polarized light propagating from an external source enters the CRT through an optically transparent entry window on one side of the tube and passes through the cell and out through an exit window. The writing and flood guns are mounted at oblique angles relative to the target substrate to keep them out of the light path. Unwritten areas of the liquid crystal cell remain in an "OFF" state that rotates by 90 degrees the polarization direction of the light emanating from the external source. Areas addressed by the writing beam are temporarily switched into an "ON" state that leaves unchanged the polarization direction of the light emanating from the external source and thereby creates a light image pattern that is detected by an analyzing polarizer positioned in the path of light exiting the exit window.

The collector electrode of the light valve of Haven is operated at a potential $V_{col}$, which is positive relative to the potential $V_{FG}$ of the target surface. The flood gun electrons strike the target surface with an energy that is below the first crossover point on the secondary electron emission ratio curve for the dielectric material forming the target surface. Under these conditions, the electrostatic potential of the target surface is stabilized to the potential of the flood gun cathode. The writing gun is operated under conditions so that the writing beam electrons strike the target surface with an energy that is above the first crossover point but below the second crossover point of the dielectric material.

When the writing beam strikes the target surface, secondary emission causes the written area to charge positive relative to the unwritten areas of the target surface, which are at the flood gun potential $V_{FG}$. The potential of the written area rises, approaching the potential $V_{COL}$ of the collector electrode and driving the liquid crystal cell into the "ON" state. After the writing beam is turned off, the potential drops back to the flood gun cathode potential $V_{FG}$ and allows the liquid crystal cell to relax to the "OFF" state. This occurs because $V_{COL}$ is below the first crossover point and more electrons are absorbed than are emitted from the previously written area.

The ring-type collector electrode is positioned adjacent the periphery of the liquid crystal cell and outside the projection light path through the valve. There is a relatively large separation between the collector electrode and the central areas of the target surface, which separation causes the collection of secondary electrons emitted from the central areas on the target surface to be relatively inefficient. The reason for such inefficiency is that secondary electrons emitted from the central areas on the target surface redeposit on the positively charged, previously written areas of the target surface. This redeposition of secondary electrons at least partly erases the written image, thereby reducing the resolution and contrast capability of the light valve.

SUMMARY OF THE INVENTION

An object of the present invention is, therefore, to provide a liquid crystal light valve characterized by high resolution and good contrast.

Another object of this invention is to provide such a light valve in which the collection of secondary electrons is substantially uniform over the entire target surface.

A further object of this invention is to provide such a light valve in which secondary electrons emitted by the target are efficiently collected to prevent unintended erasure of a written image.

A preferred embodiment of the present invention comprises a liquid crystal light valve that includes a liquid crystal cell positioned between first and second light polarizers whose light transmitting axes are in parallel alignment. The liquid crystal cell is of the twisted nematic type and includes a dielectric target substrate positioned within an evacuated envelope, an optically transparent faceplate positioned in opposed relation to the target surface, and a liquid crystal material captured between the target surface and the faceplate. Visible light emanating from a light source propagates through the first polarizer to illuminate the liquid crystal cell. A writing electron gun and an erasing electron gun communicate with the interior of the evacuated envelope and direct toward the target surface of the liquid crystal cell a writing beam and an erasing beam, respectively. The writing beam and the erasing beam sequentially strike preselected locations on the target surface to cause an emission of secondary electrons and thereby develop an electrostatic potential at such preselected locations. Current modulation of the writing beam develops the electrostatic potential at the preselected locations, which define a display image.

A secondary electron collector electrode positioned over and in substantially parallel spaced apart relation to the target surface collects in a uniform manner the secondary electrons emitted by all regions of the target surface. A collector electrode controller circuit sequentially applies first and second potential differences between the target surface and the collector electrode in synchronism with the striking of the preselected locations by the respective writing and erasing beams.

The first potential difference causes the collector electrode to collect a sufficient number of the secondary electrons to maintain the electrostatic potential at the preselected locations on the target surface. This causes the liquid crystal cell to transmit light in a first polarization sense. The second potential difference causes the collector electrode to collect a relatively small number of the secondary electrons. The remaining secondary electrons redistribute over the target surface and change the electrostatic potential at the preselected locations. This causes the liquid crystal cell to transmit light in a second polarization sense. The light transmitted by the liquid crystal cell propagates toward the second polarizer which transmits light in, for example, the first polarization sense, to provide the display image.

A more complete understanding of the present invention and its various features, advantages and objectives may be had by referring to the following detailed description and the accompanying drawings.

DETAILED DESCRIPTION OF THE INVENTION

Figure 1:
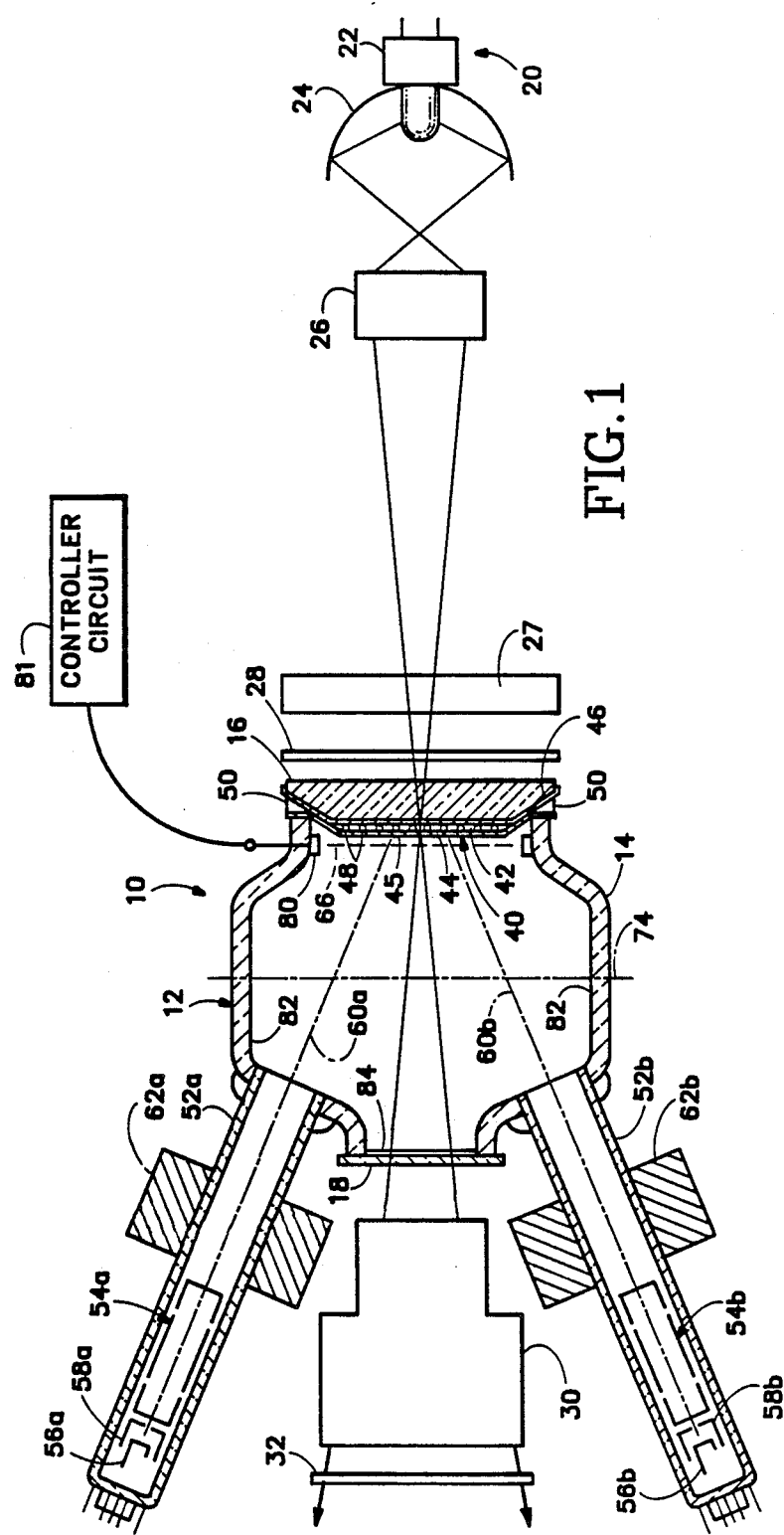
FIG. 1 is a schematic cross sectional view of an electron beam addressed liquid crystal light valve and related projection system elements provided in accordance with the present invention.

The operation of an electron beam addressed liquid crystal light valve according to the present invention is described herein by way of example only to the projection image display apparatus shown in FIG. 1. The illustrated apparatus. includes an electron beam addressed liquid crystal light valve 10 having an evacuated envelope 12 comprising a ceramic body 14, an optically transparent entry window or faceplate 16 and an optically transparent exit window 18 mounted thereto.

Light from a suitable source 20, which in this instance comprises a projection lamp 22 and a parabolic reflector 24, is directed by an input lens system 26 and a field lens system 27 through a neutral density linear polarizing filter 28 into faceplate 16. Input lens system 26 reformats the size of the area illuminated by light source 20, and field lens system 27 steers the light in the proper direction to propagate through window 18. The light exiting window 18 is projected by a projection lens system 30 through a neutral density linear polarizing filter or analyzer 32 and toward a remote viewing surface (not shown). Polarizing filter 28 and analyzer 32 are arranged so that their light transmitting axes are aligned parallel to each other. Skilled persons would appreciate that light valve 10 can be configured to operate with orthogonally aligned light transmitting axes of polarizing filter 28 and analyzer 32.

Light valve 10 has an internal liquid crystal cell 40 (enlarged in FIG. 1 for clarity) which is disposed in the path of the polarized projection light entering envelope 12 through faceplate 16. Cell 40 comprises a layer 42 of a nematic liquid crystal material captured between faceplate 16 and a thin, optically transparent target substrate 44 having a target surface 45. Target substrate 44 is formed of a suitable dielectric material such as glass, a polyimide, or mica, the last-mentioned of which being preferred. The mica can be coated with a layer of magnesium oxide (MgO) as described in copending U.S. patent application of Haven et al., Electron Beam-Addressed Liquid Crystal Cell, filed concurrently herewith. The MgO coating provides a relatively high secondary electron emission ratio. The edges of faceplate 16 and substrate 44 are sealed to the body 14 with ceramic frit seals 50 or other suitable material. Preferably the cell is assembled with the target substrate stretched over spacers 48 in the manner described in copending U.S. patent application of Chitwood et al., Liquid Crystal Cell and Method of Assembly of Same, filed concurrently herewith. The resulting tension stresses in the target substrate secure the substrate in place so that the cell will maintain a uniform thickness.

An optically transparent conductive film 46 of indium tin oxide (ITO) covering the inner surface of faceplate 16 serves as a backplate electrode for the cell. A DC voltage is applied to conductive film 46 to make it greatly more positive than the voltage of the cathode of the writing electron gun, as will be described below. Target substrate 44 is maintained at a predetermined distance from film 46 by a plurality of spacers 48 of substantially uniform height. Preferably, numerous small spacers (glass beads or photolithographically fabricated spacers, for example) are distributed fairly uniformly throughout the space between faceplate 16 and target substrate 44.

The confronting surfaces of target substrate 44 and ITO film 46 are treated to provide a homogeneous (i.e., parallel) surface alignment of the nematic material captured between them. The alignment directions of the two surfaces are arranged at right angles to provide a 90-degree twist cell. The desired surface orientation is provided in a known manner, such as by vacuum-depositing silicon monoxide (SiO) onto the surfaces at an angle of about five degrees.

Nematic liquid crystal materials suitable for use in cell 40 include a nematic liquid crystal material commercially available from E. Merck as ZLI 2244. Ideally, the nematic liquid crystal material should have a low dielectric constant and low viscosity at room temperature. Materials having such characteristics are preferable because they minimize the writing beam current required to switch the cell at speeds necessary to provide standard monochrome television image displays.

The molecules of the nematic liquid crystal material in layer 42 are ordered such that the polarization direction of plane polarized light passing through the cell is rotated 90 degrees in the absence of an applied electric field (i.e., in the "OFF" state). Whenever a potential difference is applied across any given region of the liquid crystal material, the longitudinal axes of the liquid crystal molecules in that region tend to orient themselves in a direction parallel to the resulting field, thereby decreasing the amount of rotation of the polarization direction of the light passing through that region of the cell 40. If the potential difference across cell 40 is of sufficient magnitude (i.e., in the "ON" state), the polarization direction of the light passing through that region of the cell is substantially unchanged. Since the light-transmitting axes of both polarizing filter 28 and analyzer 32 are aligned in the same direction, light passes through and is blocked by analyzer 32 whenever the light propagates from regions of cell 40 that are in the "ON" state and the "OFF" state, respectively.

Envelope 12 further comprises first and second similar elongate tubular glass necks 52a and 52b, one end of each neck being frit sealed to body 14 adjacent window 18. A writing electron emitting means or gun 54a is mounted within neck 52a. Gun 54a includes a cathode 56a, a control grid 58a, and associated electrodes for forming a narrow electron beam 60a that is directed at an oblique angle relative to and toward target substrate 44 of liquid crystal cell 40. Conductive film 46 is held at a very large positive potential relative to the potential applied to cathode 56a of gun 54a and, therefore, contributes to the acceleration potential of writing beam 60a. Video or other input signals are applied to grid 58a to modulate the beam current of electron beam 60a in accordance with the video image to be projected onto the remote viewing surface.

Figure 2:
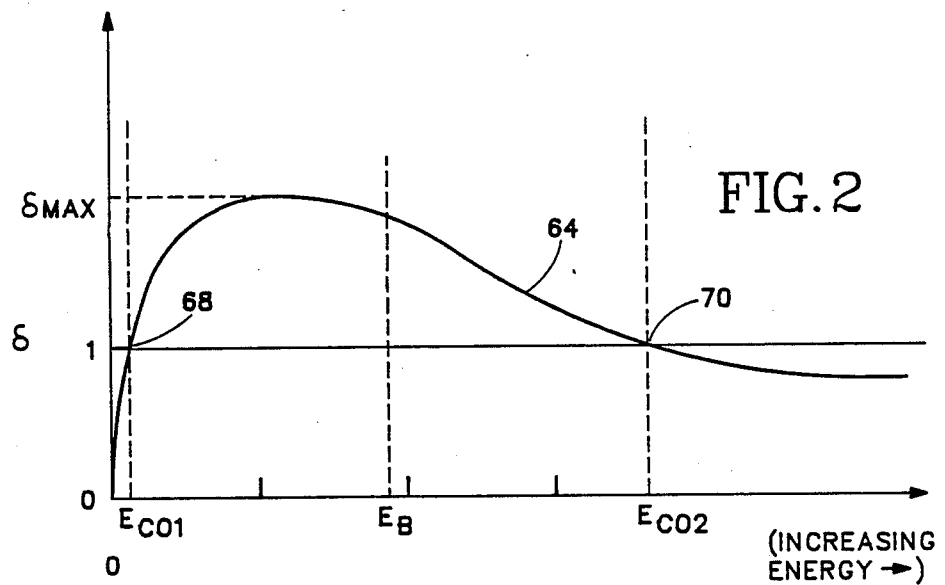
FIG. 2 is a graph of the secondary electron emission ratio curve as a function of the energy of incident electrons that strike a target substrate incorporated in the light valve of FIG. 1.
Figure 3A:
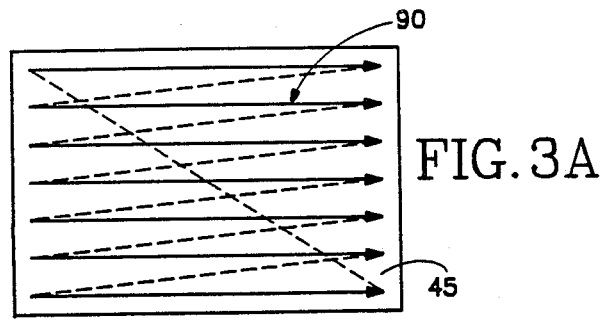
FIG. 3 shows the raster scan paths of and the effect of a secondary electron collector electrode on the trajectories of the secondary electrons emitted by the target surface of the liquid crystal cell of FIG. 1 during a write field and an erase field of a field sequential operating mode.
Figure 3B:
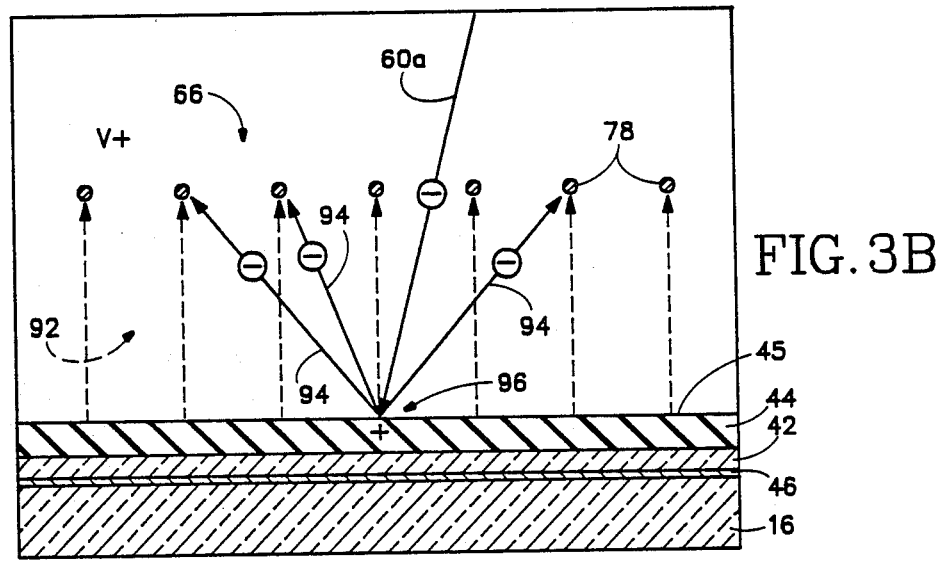
Figure 3C:
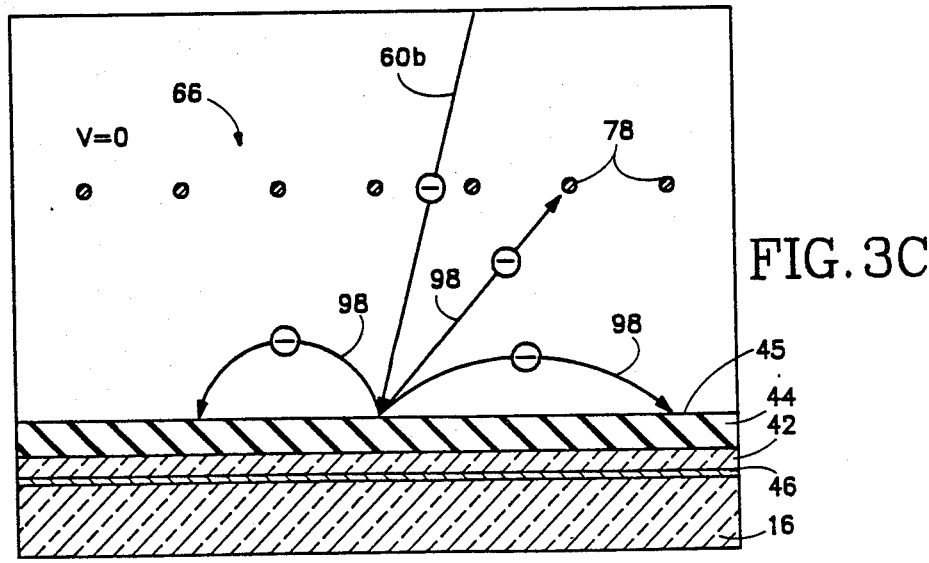

FIG. 2 shows the secondary electron emission ratio curve 64 as a function of incident electron energy for target substrate 44, and FIG. 3 shows the raster scan paths of and the effect of a secondary electron collector electrode 66 on the trajectories of the secondary electrons emitted during a writing operation and an erasing operation. With reference to FIGS. 2 and 3, the beam current modulated writing beam 60a is raster scanned across target surface 45 of target substrate 44 in response to suitable electrical signals supplied by deflection circuitry (not shown) to an electromagnetic deflection yoke 62a supported on neck 52a. (Light valve 10 could alternatively be constructed with an electrostatic deflection structure.)

Writing gun 54a is operated so that the electrons in beam 60a strike target surface 45 with an energy $E_B$, which causes the emission of secondary electrons with a secondary electron ratio greater than 1. (The secondary electron emission ratio is defined as the number of secondary electrons emitted by target substrate 44 for each incident electron striking target substrate 44.) The energy $E_B$ of writing beam 60a is greater than the energy $E_{CO1}$, which corresponds to the first unity crossover point 68 of curve 64, but is less than the energy $E_{CO2}$, which corresponds to the second unity crossover point 70 of curve 64. The significance of the value of $E_B$ relative to $E_{CO1}$ and $E_{CO2}$ is described in greater detail hereinbelow. The number of secondary electrons generated by writing beam 60a is, therefore, greater than the number of writing electrons that strike target surface 45.

Figure 4:
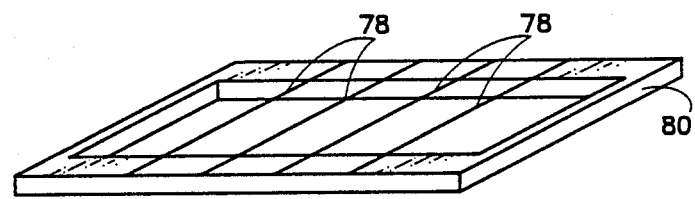
FIG. 4 shows the construction of the collector electrode incorporated in the light valve of FIG. 1.

Secondary electron collector electrode 66 can be of the grid type or mesh type and is positioned over and in substantially parallel, spaced apart relation to target surface 45. Collector electrode 66 is spaced apart from target surface 45 by a distance of about 2.54 millimeters. Collector electrode 66 comprises, for example, a grid of parallel wire segments formed by attaching segments of wire 78 of about five microns in diameter to a frame 80, as shown in FIG. 4. A grid-type collector electrode is used whenever the beam diameter is approximately equal to or smaller than the pitch of a mesh-type collector electrode. Writing beam 60a is directed through collector electrode 66 and toward target surface 45.

Whenever writing beam 60a is raster scanned over target surface 45 during a first time interval, a collector electrode controller circuit or biasing means 81 applies to collector electrode 66 a potential of about +300 volts relative o the potential on conductive film 46. Collector electrode 66 collects, therefore, the secondary electrons emitted from target surface 45. Since the secondary electron emission ratio for writing beam 60a is greater than one and the secondary electrons are collected by collector electrode 66, the areas of target surface 45 written or addressed by writing beam 60a have a positive electrostatic potential.

An erasing electron emitting means or gun 54b is mounted within neck 52b. Gun 54b includes a cathode 56b, a control grid 58b, and associated electrodes for forming a narrow electron beam 60b that is directed at an oblique angle relative to and toward target substrate 44 of liquid crystal cell 40. After a complete raster scan of target surface 45 by writing beam 60a, erasing beam 60b is raster scanned across target surface 45 in response to suitable electrical signals supplied by deflection circuitry (not shown) to an electromagnetic deflection yoke 62b supported on neck 52b, thereby to complete a video image field. Erasing gun 54b is operated in a manner similar to that of writing gun 54a. The electrons in beam 60b strike target surface 45 with the energy $E_B$. There is no need for, but there could be, modulation of the beam current of erasing beam 60b during the raster scan of target surface 45.

Whenever erasing beam 60b is raster scanned across target surface 45 during a second time interval, the collector controller circuit 81 applies to collector electrode 66 a potential of about zero volts relative to the potential on conductive film 46. Such a potential on collector electrode 66 causes the secondary electrons to redeposit primarily on target surface 45 and thereby erase the image that had previously been addressed by writing beam 60a. The effect of collector electrode 66 is to stabilize at zero volts the electrostatic potential at any point on target surface 45 relative to the potential on conductive film 46. This would be true for any energy value of erasing beam 60b between $E_{CO1}$ and $E_{CO2}$. The image can, of course, be maintained by rewriting it at a suitable refresh rate. In a 60 Hz noninterlaced display monitor for computers, for example, each field would be scanned every $16\frac{2}{3}$ milliseconds by the writing beam, but information would be written in alternate fields. The display would be erased in the field during which no writing takes place. Therefore, the information refresh rate would be 33.33 milliseconds.

A conductive coating 82 on the interior surface of ceramic body 14 is electrically connected to a conductive film 84 of ITO on the inner surface of window 18. Coating 82 and film 84 are connected to the a potential of about 100 volts more positive than the maximum potential (i.e., +300 volts relative to conductive film 46) of collector electrode 66 and prevent the inner surfaces of respective body 14 and window 18 from accumulating electrical charge during the operation of light valve 10.

With particular reference to FIG. 2, the first unity crossover point 68 represents the lowest primary electron energy $E_{CO1}$ at which the secondary electron emission ratio 64 is equal to 1. Whenever the energy of the primary electrons in an incident beam is less than $E_{CO1}$, the number of secondary electrons emitted from the target substrate is less than the number of primary electrons that strike the target substrate. Similarly, the second unity crossover point 70 represents the highest primary electron energy $E_{CO2}$ at which the secondary electron emission ratio 64 is equal to 1. Whenever the energy of the primary electrons in an incident beam is greater than $E_{CO2}$, the number of secondary electrons emitted from the target substrate is less than the number of primary electrons that strike the target substrate.

The primary electron energy values that lie between $E_{CO1}$ and $E_{CO2}$ correspond to secondary electron emission ratios on curve 64 that are greater than 1. The energy $E_B$ of the electrons in beams 60a and 60b is selected to provide nearly the maximum secondary electron emission ratio, $\delta_{MAX}$.

FIG. 3 illustrates the operation of light valve 10 in the field sequential mode. With reference to FIG. 3, writing beam 60a is scanned in a raster pattern 90 over target surface 45 during a first time interval to form a write field in which image features are addressed on target surface 45. During the write field, collector controller circuit 81 applies to mesh electrode 66 a potential of about +300 volts relative to the potential on conductive film 46 to create electric force field lines 92 that are normal to target surface 45 and directed toward collector electrode 66. As a result, the secondary electrons generated by writing beam 60a as it strikes target surface 45 propagate along paths 94 that are directed toward mesh electrode 66, which collects a substantial number of the secondary electrons emitted. Mesh electrode 66 collects in a substantially uniform manner the secondary electrons emitted by all addressed areas of target surface 45.

Since the secondary electrons are collected by mesh electrode 66 and the energy $E_B$ of writing beam 60a provides a secondary electron emission ratio of greater than one, a region 96 addressed by writing beam 60a has a net positive electrostatic potential. The amount of change deposited at region 96 of target surface 45 is proportional to the product of the average current $I_W$ of writing beam 60a and the secondary electron emission ratio that corresponds to the energy $E_B$ of the electrons in beam 60a. The electrostatic potential at region 96 cooperates with the potential on conductive film 46 to create between target substrate 44 and conductive film 46 an electric field that drives region 96 of liquid crystal cell 40 into the "ON" state.

Similarly, erasing beam 60b is scanned in a raster pattern 90 over target surface 45 during a second time interval to form an erase field in which image features addressed by writing beam 60a are erased. During the erase field, mesh electrode 66 receives a potential of zero volts relative to the potential on conductive film 46 to create a substantially field-free region between target surface 45 and mesh electrode 66. As a result, the secondary electrons generated by erasing beam 60b as it strikes target surface 45 propagate along paths 98 that are primarily directed toward target surface 45, thereby redepositing the secondary electrons substantially uniformly over the target surface.

Since the secondary electrons are redeposited on target surface 45 and addressed region 96 has a positive electrostatic potential, addressed region 96 attracts proportionally more secondary electrons than the regions not addressed by writing beam 60a. The redeposition of secondary electrons during the erase field eliminates, therefore, the positive electrostatic potential generated at area 96 by writing beam 60a. The erase field provides over target surface 45 a substantially uniform electrostatic potential, and the potential difference between target surface 45 and conductive film 46 drives all regions of liquid crystal cell 40 into the "OFF" state.

Figure 5A:
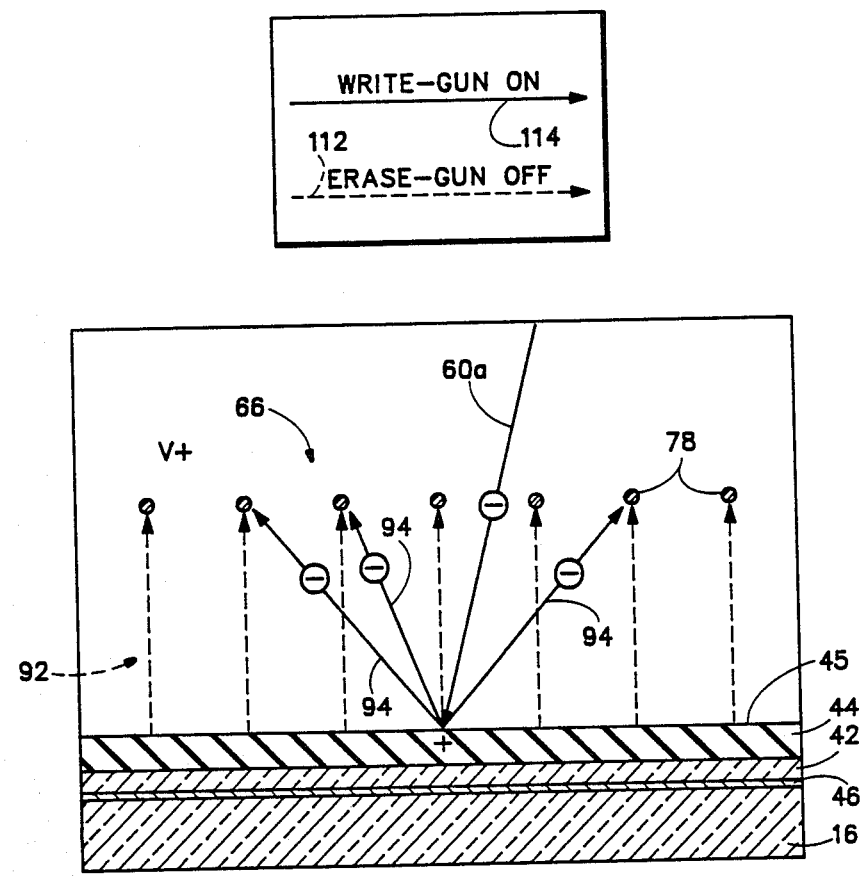
FIG. 5 shows exemplary horizontal scans and the effect of a secondary electron collector electrode on the trajectories of the secondary electrons emitted from the target surface of the liquid crystal light valve of FIG. 1 operated in an erase on retrace (EOR) operating mode.
Figure 5B:
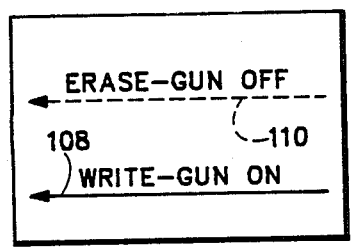
Figure 5B:
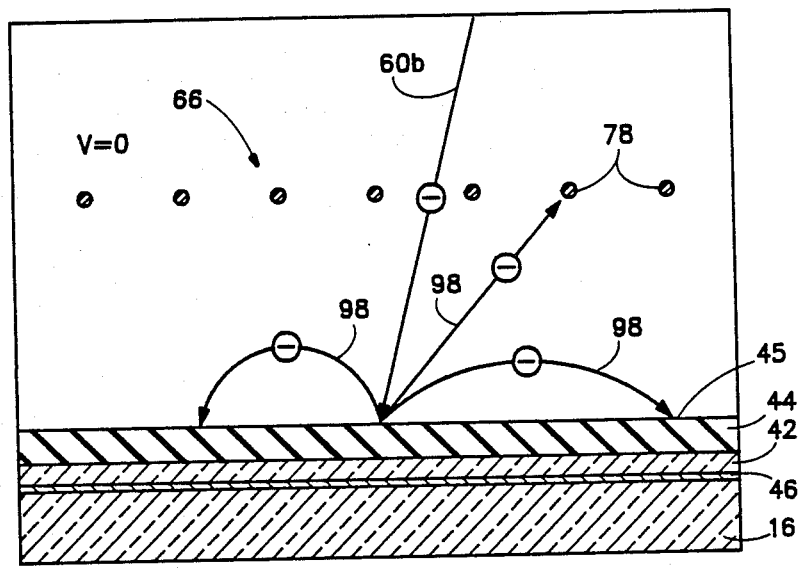

FIG. 5 illustrates the operation of light valve 10 in an erase on retrace (EOR) mode. With reference to FIG. 5, writing beam 60a and erasing beam 60b are raster scanned over target surface 45 simultaneously, but the raster scan of erasing beam 60b leads the raster scan of writing beam 60a. Image features that had been addressed during a horizontal scan (not shown) of writing beam 60a in a particular image field are erased by a corresponding horizontal scan 108 of erasing gun 60b. Horizontal scan 108 of erasing gun 60b occurs during the horizontal blanking interval and horizontal retrace 110 of writing beam 60a. During the subsequent horizontal blanking interval and horizontal retrace 112 of erasing beam 60b, image features are addressed on target surface 45 by writing beam 60a in a horizontal scan 114.

An image field of a video display image is formed by repeating the above-described pattern over a complete raster scan of target surface 45 by writing beam 60a and erasing beam 60b. The image can, of course, be maintained by rewriting it at a suitable refresh rate. In a conventional 60 Hz interlaced display for televisions, for example, each image field would be simultaneously scanned every 16⅔ milliseconds by writing beam 60a and erasing beam 60b. Therefore, the field information refresh occurs every 16⅔ milliseconds.

Collector electrode 66 is used in the EOR mode in a manner similar to that used in the field sequential mode. During the horizontal scan 114 of writing beam 60a, collector controller circuit 81 applies to collector electrode 66 a potential of +300 volts relative to the potential on conductive film 46 to create electric field force lines 92 that are normal to target surface 45 and directed toward collector electrode 66. As a result, the secondary electrons generated by writing beam 60a as it strikes target surface 45 propagate along paths 94 that are directed toward collector electrode 66, which collects a substantial number of the secondary electrons emitted.

The energy $E_B$ of writing beam 60a provides a secondary electron emission ratio greater than 1. Since the secondary electrons are collected by collector electrode 66, region 96 addressed by writing beam 60a has a net positive electrostatic potential. The electrostatic potential at region 96 and the potential on conductive film 46 create between target substrate 44 and conductive film 46 an electric field that drives region 96 of liquid crystal cell 40 into the "ON" state.

During the horizontal scan 108 of erasing beam 60b, collector controller circuit 81 applies to collector electrode 66 a potential of zero volts relative to the potential on conductive film 46 to create a substantially field-free region between target surface 45 and collector electrode 66. As a result, the secondary electrons generated by erasing beam 60b as it strikes target surface 45 propagate along paths 98 that are primarily directed toward target surface 45, thereby redepositing the secondary electrons on the target surface.

Since the secondary electrons are redeposited on target surface 45 and addressed region 96 has a positive electrostatic potential, addressed region 96 attracts proportionally more secondary electrons than the regions not addressed by writing beam 60a. The redeposition of secondary electrons during the scan of erasing beam 60b eliminates, therefore, the positive electrostatic potential generated at area 96 by writing beam 60a. The scan of erasing beam 60b provides over target surface 45 a substantially uniform electrostatic potential, which together with the potential on conductive film 46 drives all regions of liquid crystal cell 40 into the "OFF" state.

Figure 6:
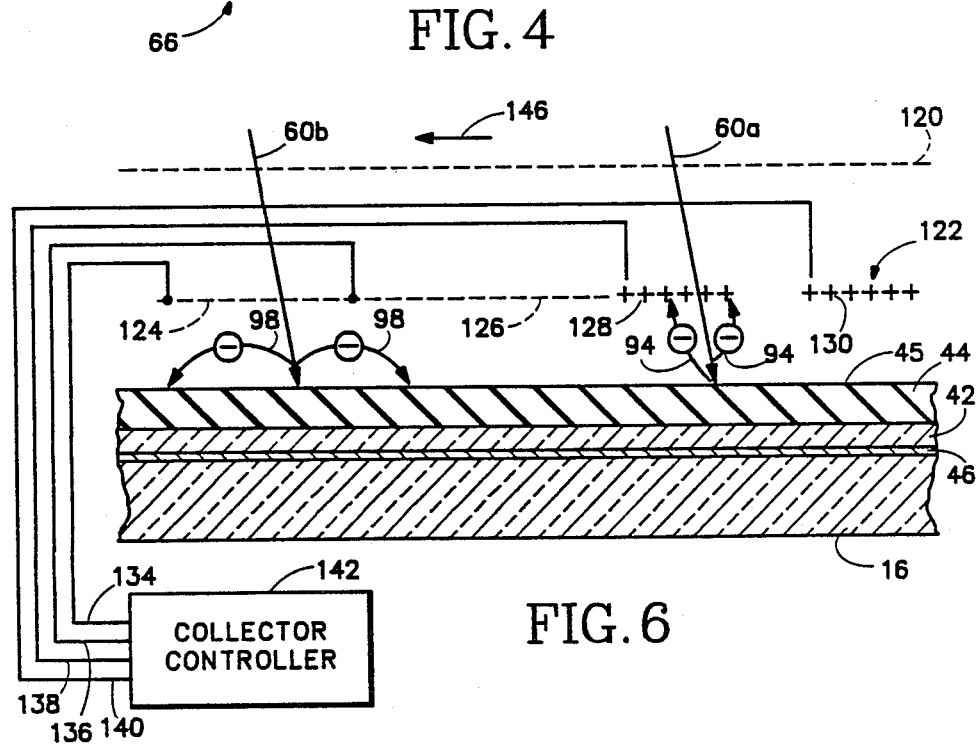
FIG. 6 shows an exemplary horizontal scan and the effect of a segmented collector electrode on the trajectories of the secondary electrons emitted by the target surface of the liquid crystal light valve of FIG. 1.

FIG. 6 illustrates a mode of operating light valve 10 in which collector electrode 66 constitutes a screen grid electrode 120 and a segmented collector electrode 122 that comprises four collector segments 124, 126, 128, and 130. Collector segments 124, 126, 128, and 130 are electrically connected to respective signal outputs 134, 136, 138, and 140 of a collector controller circuit 142. Screen grid 120 receives a constant positive potential relative to the potential applied to cathodes 56a and 56b to prevent "beam steering" in the region between electron guns 52a and 52b and target surface 45.

Writing beam 60a and erasing beam 60b are simultaneously raster scanned across target surface 45 in a direction 146 so that writing beam 60a follows erasing beam 60b. Image features previously addressed during a horizontal scan (not shown) of writing beam 60a in a particular image field are erased by erasing beam 60b. Writing beam 60a and erasing beam 60b are directed through different ones of collector segments 124, 126, 128, and 130 and toward target surface 45. Collector controller circuit 142 operates in synchronism with the raster scanning of beams 60a and 60b across segmented collector electrode 122. Collector controller circuit 142 applies a potential of +300 volts (relative to the potential on conductive film 46) to the one of collector segments 124, 126, 128, and 130 through which writing beam 60a is directed and a potential of zero volts (relative to the potential on conductive film 46) to the one of collector segments 124, 126, 128, and 130 through which erasing beam 60b is directed.

At the instant illustrated in FIG. 5, writing beam 60a is directed through collector segment 128 and erasing beam 60b is directed through collector segment 124. Collector controller circuit 142 applies, therefore, the +300 volt and zero volt potentials to collector segments 128 and 124, respectively.

Segmented mesh electrode 116 provides for writing beam 60a and erasing beam 60b electric fields that are similar to those described above in connection with the field sequential and EOR operating modes. Since collector segment 128 through which writing beam 60a is directed receives a potential of +300 volts relative to the potential on conductive film 46, the secondary electrons generated by writing beam 60a as it strikes target surface 45 propagate along paths 94 that are directed toward collector segment 128, which collects a substantial number of the secondary electrons emitted. Similarly, since collector segment 124 through which erasing beam 60b is directed receives a potential of zero volts relative to the potential on conductive film 46, the secondary electrons generated by erasing beam 60b as it strikes target surface 45 propagate along paths 98 that are primarily directed toward target surface 45, thereby redepositing the secondary electrons on the target surface.

The energy $E_B$ of writing beam 60a provides a secondary electron emission ratio greater than 1. The collection and redeposition of the secondary electrons drives liquid crystal cell 40 into the "ON" state and "OFF" state, respectively, as described hereinabove.

With the energy $E_B$ of the electrons in beams 60a and 60b between the energy $E_{CO1}$ of first crossover point 64 and the energy $E_{CO2}$ of second crossover point 68. An incomplete erasure of the region addressed by writing beam 60a could result in a positive charge accumulation on target surface 45 because the energy value $E_B$ of electron beams 60a and 60b lie between $E_{CO1}$ and $E_{CO2}$. The above-described operating modes of the present invention limit, however, the accumulation of excessive charge that would damage liquid crystal cell 40.

Secondary electrons emanating from target surface 45 toward collector electrode 66, which has a positive potential, creates a positive electrostatic potential on target surface 45. A positive charge will accumulate on target surface 45 only until such charge reaches the positive potential on collector electrode 66. The present operating mode and the positive potential on collector electrode 66 provide, therefore, a clamp on the amount of charge that can accumulate on target surface 45. Under normal operating conditions, the electrostatic potential on target surface 45 never approaches the potential on collector electrode 66.

It will be obvious to those having skill in the art that many changes may be made in the above-described details of the preferred embodiment of the present invention without departing from the underlying principles thereof. For example, certain types of liquid crystal cells do not require polarized light to modulate incident light electro-optically. As another example, the liquid crystal light valve can be operated in more than two states to provide images of different gray scale intensities. The scope of the present invention should be determined, therefore, only by the following claims.

We claim:

1. In an electron beam-addressed liquid crystal light modulator having writing and erasing means for emitting a writing beam of primary electrons and an erasing beam of primary electrons that strike a target surface of a liquid crystal cell to cause the emission of secondary electrons from the target surface, a method of sequentially addressing and erasing selected regions on the target surface with the respective writing and erasing beams, comprising:
   scanning the writing beam across the target surface to successively address selected regions thereof; and
   scanning the erasing beam across the target surface to successively erase the selected regions.

2. The method of claim 1 in which the scanning of the writing beam and erasing beam defines plural scan lines along which the selected regions are positioned, and the writing beam and erasing beam are scanned along all of the scan lines during respective first and second nonoverlapping time intervals, whereby the writing beam addresses the selected regions during the first time interval and the erasing beam erases the selected regions during the second time interval.

3. The method of claim 1 in which the writing beam and erasing beam are scanned across the target surface during each one of multiple successive image field time intervals, the scanning of the writing beam and erasing beam defines during each image field time interval plural scan lines along which the selected regions are positioned, and the writing beam and erasing beam are scanned in alternation along ones of the scan lines during an image field time interval such that the writing beam addresses a selected region after it is erased by the erasing beam, whereby the selected region addressed by the writing beam during the image field time interval is erased by the erasing beam during a next succeeding image field time interval.

4. The method of claim 3 in which the writing beam and erasing beam are each scanned in a raster pattern.

5. The method of claim 3 in which the scanning of the writing beam and the erasing beam further defines plural retrace lines between the plural scan lines, and the erasing beam scans a retrace line as the writing beam scans a scan line.

6. The method of claim 5 in which the writing beam scans a retrace line as the erasing beam scans a scan line.

7. The method of claim 2 in which the light modulator includes an optically transparent electrode structure spaced apart from and positioned over a substantial portion of the target surface, and biasing means for selectively applying first and second potential differences between the electrode structure and target surface during the respective first and second nonoverlapping time intervals.

8. The method of claim 7 in which the writing beam and erasing beam are each scanned in a raster pattern.

9. In an electron beam-addressed liquid crystal light modulator having writing and erasing means for emitting a writing beam of primary electrons and an erasing beam of primary electrons that strike a target surface of a liquid crystal cell to cause the emission of secondary electrons from the target surface, a method of sequentially addressing and erasing selected regions on the target surface with the respective writing and erasing beams, comprising:
    scanning the writing beam across the target surface to successively address selected regions thereof, the scanning of the writing beam defining plural scan lines along which the selected regions are positioned and the writing beam being scanned along all of the scan lines during a first time interval; and
    directing the erasing beam toward the selected regions of the target surface during a second time interval to erase the selected regions, the first and second time intervals being nonoverlapping.

10. The method of claim 9 in which the light modulator includes an optically transparent electrode structure spaced apart from and positioned over a substantial portion of the target surface, and biasing means for selectively applying first and second potential differences between the electrode structure and the target surface during the respective first and second nonoverlapping time intervals.

11. The method of claim 10 in which the writing beam is scanned in a raster pattern.

12. An electron beam-addressed liquid crystal light modulator having writing and erasing means for emitting a writing beam of primary electrons and an erasing beam of primary electrons that strike a target surface of a liquid crystal cell to cause the emission of secondary electrons from the target surface, the writing beam addressing selected regions on the target surface and the erasing beam erasing previously addressed regions on the target surface, the light modulator, comprising:
    an optically transparent electrode structure having first and second electrode segments that are spaced apart from and positioned over different portions of the target surface;
    biasing means for alternately applying first and second potential differences between the target surface and the first and second electrode segments; and
    beam directing means for alternately directing the writing beam and erasing beam through the first and second electrode segments, the writing beam being directed through the one of the first and second electrode segments to which the first potential difference is applied and the erasing beam being directed through the one of the first and second electrode segments to which the second potential difference is applied,
    the first potential difference developing an electric field of a first intensity that causes a large number of the secondary electrons generated by the writing beam to collect on the electrode segment to address a predetermined region of the target surface, and the second potential difference developing an electric field of a second intensity that causes a large number of the secondary electrons generated by the writing beam to deposit on the target surface to erase a previously addressed region of the target surface.

13. The light modulator of claim 12 in which the writing beam and erasing beam are scanned concurrently across the target surface such that they are directed through different ones of the first and second electrode segments.

14. The light modulator of claim 12 in which the writing beam and erasing beam are each scanned in a raster pattern across the target surface and the raster patterns of the writing beam and erasing beam include plural scan lines and plural retrace lines.

15. The light modulator of claim 14 in which the writing beam and erasing beam scan the respective scan lines and retrace lines simultaneously.

16. The light modulator of claim 14 in which the writing and erasing beams simultaneously scan respective overlapping scan lines and retrace lines.

17. The light modulator of claim 14 in which the electrode segments extend in a first direction, and the scan lines and retrace lines extend in a second direction that is transverse to the first direction.

* * * * *